United States Patent
Mueck (10) Patent No.: US 10,685,504 B2
(45) Date of Patent: Jun. 16, 2020

(54) SYSTEMS, DEVICES, AND METHODS FOR VEHICULAR COMMUNICATION

(71) Applicant: Intel Corporation, Santa Clara, CA (US)

(72) Inventor: Markus Dominik Mueck, Unterhaching (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/143,515

(22) Filed: Sep. 27, 2018

(65) Prior Publication Data

US 2019/0051062 A1    Feb. 14, 2019

(51) Int. Cl.
  *G07C 5/00*    (2006.01)
  *H04W 4/021*   (2018.01)
  *H04W 4/40*    (2018.01)

(52) U.S. Cl.
  CPC ........... *G07C 5/008* (2013.01); *H04W 4/021* (2013.01); *H04W 4/40* (2018.02)

(58) Field of Classification Search
  CPC ..... G06Q 20/4016; G07C 5/008; H04W 4/40; H04W 4/021; H04W 12/08; H04W 72/0406; H04W 12/12; H04W 12/02
  See application file for complete search history.

(56) References Cited

U.S. PATENT DOCUMENTS

| | | | | |
|---|---|---|---|---|
| 9,491,616 | B2* | 11/2016 | Brandt | H04W 4/029 |
| 10,341,858 | B1* | 7/2019 | Pawar | H04L 63/1491 |
| 2011/0061106 | A1* | 3/2011 | Kovacs | G06F 21/6263 |
| | | | | 726/26 |
| 2012/0143808 | A1* | 6/2012 | Karins | G06N 7/005 |
| | | | | 706/46 |
| 2012/0288138 | A1* | 11/2012 | Zeng | G08G 1/09623 |
| | | | | 382/103 |
| 2013/0151088 | A1* | 6/2013 | Ricci | G06F 17/00 |
| | | | | 701/51 |
| 2014/0140575 | A1* | 5/2014 | Wolf | G06K 9/3233 |
| | | | | 382/103 |
| 2015/0079932 | A1* | 3/2015 | Zelinka | H04W 4/029 |
| | | | | 455/411 |
| 2015/0186891 | A1* | 7/2015 | Wagner | G06O 20/4016 |
| | | | | 705/39 |
| 2017/0285632 | A1* | 10/2017 | Bostick | G08G 5/0026 |
| 2017/0300757 | A1* | 10/2017 | Wolf | G06K 9/00771 |
| 2018/0302415 | A1* | 10/2018 | Chakraborty | H04W 4/025 |
| 2019/0051062 | A1* | 2/2019 | Mueck | G07C 5/008 |

* cited by examiner

*Primary Examiner* — An T Nguyen
(74) *Attorney, Agent, or Firm* — Viering, Jentschura & Partner MBB (57) ABSTRACT

A method for dynamically handling traffic data can include obtaining location data and sensor data corresponding to at least one object located in a traffic area. The location data and/or the sensor data then can be selectively blurred to preserve privacy or meet privacy regulations. The blurring may be implemented by adding noise to the location data and/or the sensor data. The blurred data may then be transmitted to another entity.

18 Claims, 7 Drawing Sheets

SYSTEMS, DEVICES, AND METHODS FOR VEHICULAR COMMUNICATION

TECHNICAL FIELD

Various embodiments relate generally to vehicular communication technologies.

BACKGROUND

Prior to their roll-out, technologies such as ITS-G5 and LTE C-V2X are currently challenged for privacy concerns (See "The Article 29 Working Party" of the European Commission). In case that the privacy concerns are not being resolved, first generation technologies such as ITS-G5 and/ or LTE C-V2X equipment may need to be removed/deactivated.

SUMMARY

In accordance with exemplary embodiments of the present disclosure, a method for dynamically handling traffic data, the method executed by one or more computers includes obtaining, location data and sensor data corresponding to at least one object located in a traffic area; blurring the sensor data and the location data, the blurring comprising adding noise to the location data and/or the sensor data; and transmitting, the blurred data.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

The term "vehicular communication device" refers to any type of mobile machine or device or system that can communicate with other communication devices or systems. Vehicular communication devices may include dedicated communication components (for example in the manner of a terminal device, network access node, and/or relay node), that are configured to communicate with other communication devices such as terminal devices, network access nodes, and other vehicular communication devices. Vehicular communication devices can be terrestrial vehicles (e.g., automobiles, cars, trains, motorcycles, bicycles, utility vehicles, terrestrial drones or robots, or other land-based vehicles), aerospace vehicles (e.g., airplanes, helicopters, aerial drones, rockets, spacecraft, satellites, or other aeronautic or astronautic vehicles), and/or aquatic or sub-aquatic vehicles (e.g., boats, submarines, or other water/fluid-based vehicles). Vehicular communication devices may or may not transport passengers or cargo.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-MI bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 timeframe), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates a total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) wherein particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. i.e., some or all features defined for network equipment may be implemented by a UE.

Exemplary embodiments of the present disclosure can be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

Figure 1:
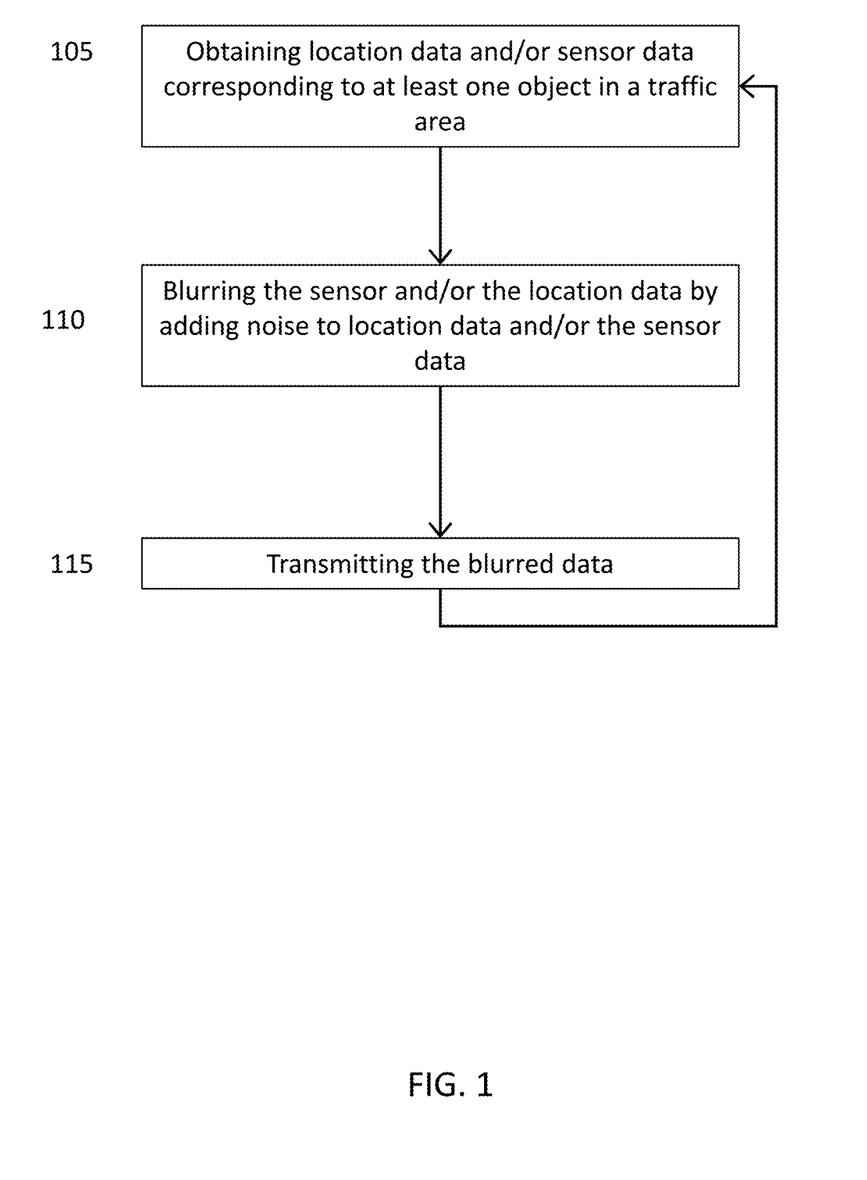
FIG. 1 shows an exemplary process according to at least one exemplary embodiment of the present disclosure.

FIG. 1, shows according to an exemplary embodiment, a method for dynamically handling traffic data. One or more computing devices may implement the exemplary method. In one example, a process of FIG. 1 or another similar thereto, may be performed or executed by a suitable device or system, such as the exemplary system depicted in FIG. 2.

Figure 2:
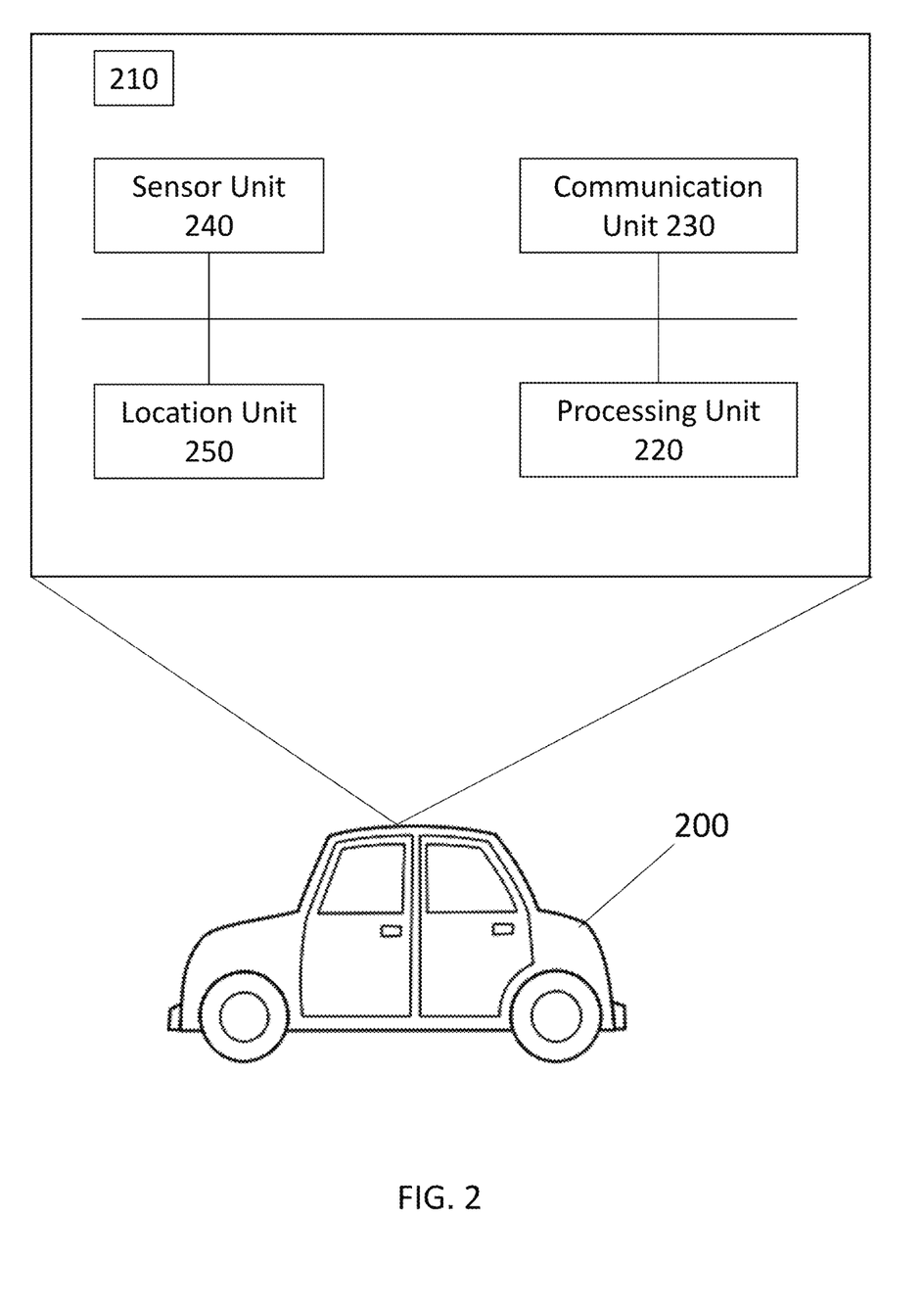
FIG. 2 is a block diagram showing exemplary functions of system according to at least one exemplary embodiment of the present disclosure.

In the exemplary embodiment of FIG. 2, a traffic data handling system includes a location unit 210, a sensor unit, 220, a communication unit, and a control unit 240. The units may be implemented in part or in whole by one or processors executing software instructions. For example, the processing unit 220, may include one or more computing devices, e.g., one or more processors configured to execute software instructions so as to implement at least aspect of FIG. 1. The software may be stored and accessible form in a non-volatile memory or storage. The processing unit 220 may be configured to interface with one or more other components of the systems, such as the communication unit 230, the sensor unit 240, and the location unit 250.

The communication unit 230 may include any suitable hardware and/or software to implement any communication method, or protocol described herein, including, e.g., cellular communication, vehicular communication, WiFi communication, etc.

The sensor unit 240 may include any sensor for detecting traffic activity or collecting traffic information concerning, e.g., vehicles, pedestrians, accidents, etc. For example, the sensor unit 240 may include at least one of a sonar sensor, a LIDAR sensor, radar sensor, a video/camera image sensor, or a V2X sensor. For example, an image capturing apparatus may capture the image at a public location or location. In one example, the image may have been taken by a camera, e.g., positioned on a vehicle in a city. Or, an image apparatus may be incorporated into a station object, e.g., a traffic light, traffic sign, a road side unit, etc.

The location unit 250 may be any apparatus configured to obtain position information of one or more objects. For example, the location unit may include a satellite-based radio navigation receiver (e.g., GPS, Galileo, GLONASS) and/or any include hardware or apparatus to employ any other navigation system. For example, the location unit 250 may use cellular data to obtain or determine location data.

While FIG. 2 shows the processing unit 220, the communication unit 230, the sensor unit 240, and the location unit 250 as separate entities, this is not necessarily so as they may be integrated or combined together as is appropriate. For example, the various units may be integrated together as single device or apparatus.

Referring back to FIG. 1, at 105, the method includes obtaining location data and sensor data corresponding to at least one object in a traffic area. In the context of FIG. 2, the system 210 may receive location information concerning a traffic object for a traffic area. For example, in context of FIG. 2, the system 210 may obtain the location data of the vehicle 200 itself, for example, through a satellite navigation system receiver that is part of the location unit 250. Also, the system 210 may obtain sensor data from the vehicle through the sensor data obtained from at least one sensor unit 240.

The traffic area may be a predefined area or a geographical area within a certain radius of a given system 210. Similar, sensor data may also be obtained corresponding to the traffic object through at least one sensor of the sensor unit 240 or may be obtained through the communication unit 230. The obtained sensor and location data may be further processed or refined by the processing unit 220.

In other examples, the system 210, whether or not it is part of a vehicle 200, a roadside unit (e.g., DSRC roadside unit), etc., may obtain location data and sensor data through other means, e.g., it may receive the location data and the sensor data wirelessly through the communication unit 250. The system 210 may obtain location and sensor data from another object, e.g., another vehicle (which the system 210 is not part of), pedestrian, bicyclist, communication node, etc. For example, the pedestrian, bicyclist, etc. may have a terminal device that transmit location data through any suitable communication means including through another intermediary device or system.

Accordingly, the received location data and sensor data associated with the at least one through the communication unit 250 may indicate the location or position of the at least one object in the traffic area. The location data and the sensor data may be obtained by the one or more computers or computing devices of the processing unit 220.

Further, at step 110 of FIG. 1, the method further includes blurring the sensor and the location data. Blurring may include any means to alter, mask, or obfuscate the original sensor (location) data so that the privacy of the concerned of individuals, e.g., user(s) are respected. In other words, the blurring may at least help anonymize the vehicle or persons represented in the blurring data.

In various embodiments, there may be different levels of privacy requirements for different users and/or different circumstances (such as special events, e.g. a suddenly appearing obstacle on the road) requiring access to more precise data. The different requirements and/or the different circumstances may be handled with a differentiated alternation of the original sensor (location) data. For example, a hierarchy of data alternation may be introduced with some system(s)/device(s)/vehicle(s) applying a highest level of alternation (highest hierarchy level) while others apply a lower level of alternation (lower hierarchy levels). One way to achieve this alternation is by adding noise to location data and/or the sensor data. That is, referring back to the example involving FIG. 2, the obtained location data and sensor data may be processed by one or more computing devices, e.g., one or more processors of the processing unit 220.

For example, if location data may include data including or a function of position coordinates (X0 and Y0), represented as Pos_exact=(X0,Y0);

Accordingly, adding noise to the location data may be represented as:

Pos_blurred=(X0+epsilon_x,Y0+epsilon_y)

where, epsilon_x and epsilon_y represent additive noise

Figure 5:
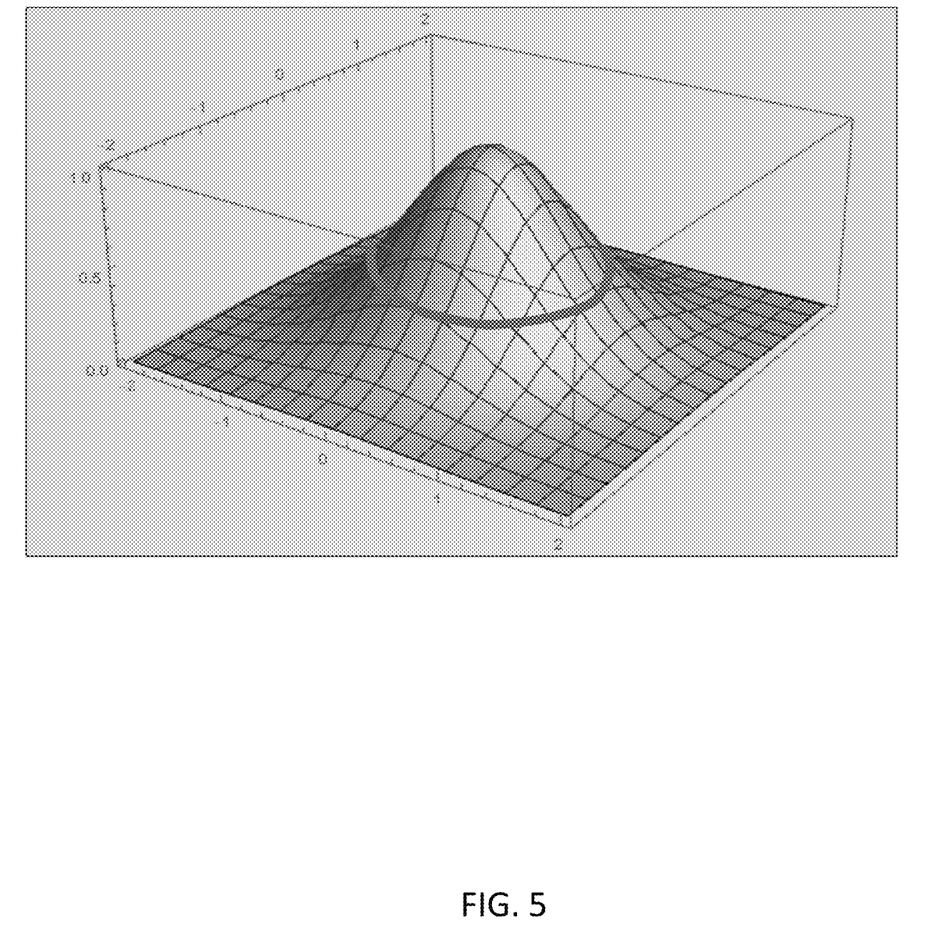
FIG. 5 shows an exemplary representation of additive white Gaussian white noise.

Further, in exemplary embodiments, the blurring is achieved using additive noise, e.g., Gaussian noise (AWGN), for example. The additive noise may be applied in such a manner that the noise is centered at a point, e.g., a location of an object. The additive noise may be specified or predefined with a certain variance or standard deviation from a central location point. FIG. 5 shows a visual example of AWGN which may be applied with the center of the noise, i.e., the peak of the noise added to a center point and the rest of the noise applied accordingly around this center point.

As noted, the processing unit 220 can add noise to the location data and sensor data in such a way so as to blur the data. In general, the blurring does not render the location and sensor data unintelligible. Instead, the blurring by adding the noise may "spread" the data. The blurred data may then indicate the object is located over a spread area, that is the object is located in a location area that is greater (or smaller) in size than the location area from the acquired location data and/or sensor data. For example, the location data and/or the sensor data may be blurred so that the data cannot be used to identify the at least one object to which the data pertains.

Referring again to FIG. 1, after blurring, the blurred data is transmitted at 115. The vehicle may be transmitted through any suitable means. For example, the blurred data is transmitted wirelessly means to one more other devices. For example, one vehicle may transmit the blurred data to another vehicle, e.g., wirelessly (V2V), or may transmit any other embodiment to a person with a wirelessly communicative device (e.g., smartphone, wearable device), or in some embodiments vice-versa (e.g., from terminal device to a vehicle). Alternatively, or additionally, the blurred data may be transmitted from a vehicle to a communication node or access point, e.g., to a roadside unit that is part of a vehicular communication system (V2I) or base station through mobile communication means.

In other exemplary embodiments, the process of FIG. 1 or a related process may be implemented at a communication node and/or a system or device, such as 210, operatively coupled to the communication node. Accordingly, a roadside unit, an access point, a base station, etc. or one or more computing devices operatively thereto may generate blurred data. This blurred data may then be transmitted wirelessly to a vehicle, to a user device (smartphone, tablet, watch, etc.), or may be transmitted to another access point or communication node through any suitable communication means described herein.

Figure 6:
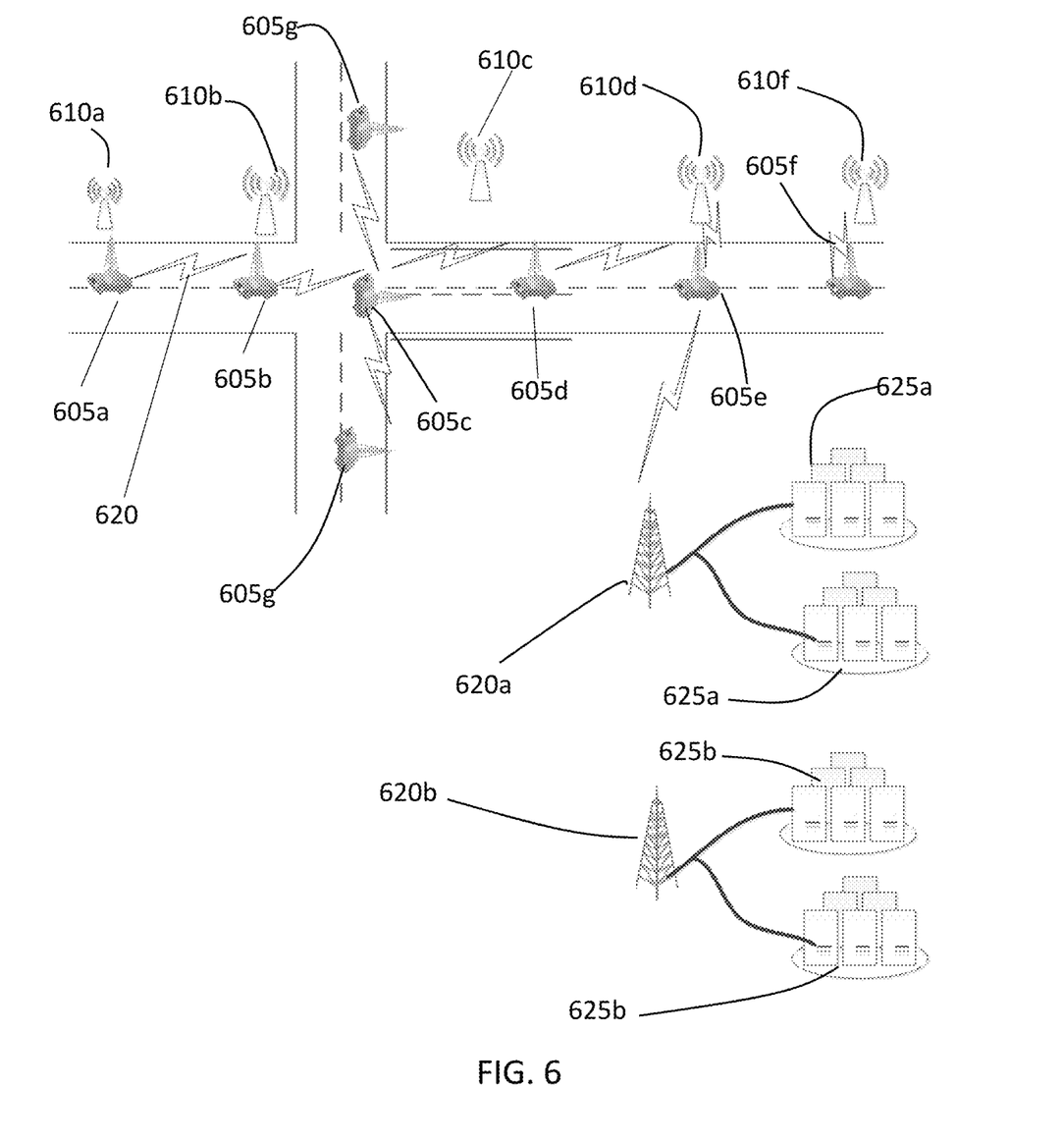
FIG. 6 is exemplary views of environment in which methods or processes described herein are implemented according to at least one exemplary embodiment of the present disclosure.

FIG. 6 depicts, according to an exemplary embodiment of the present disclosure, an environment in which the process of FIG. 1 or another similar variant may be realized. As shown in FIG. 6 various vehicles may be located within a given traffic area. For simplicity sake, FIG. 6 depicts the vehicles as cars. However, other types of vehicles or entities, e.g., trucks, SUVs, bicycles, motorcycles, pedestrians, etc. may be found instead. In the traffic area, the vehicles 605 may be operatively communicative with other vehicles or communication nodes. For example, the vehicle 605a may wirelessly communicate with vehicle 605b, which in turn can wirelessly communicate with vehicle 605c, and so on. Further, the vehicles 605 may communicate with access points or communication nodes 610. For example, vehicle 605e communicates with access point 610d, and vehicle 605f communicate with access point 610f.

The vehicles and (stationary) access points 610 may be part of a wireless, e.g., a V2V communication system. Further, the vehicle may communicate with other types of communication nodes, for example with base stations that part of a cellular or other suitable radio access network. For example, vehicle 605e communicates with the base station 620a. The base station 620a may include or operatively connected to the computing device(s) 625a. (Additionally, the access points may include or be operatively connected to computing devices and other data networks, e.g., Internet).

The access points depicted in FIG. 6 (e.g., nodes 610 and base stations 620) may be base stations NodeBs, Base Transceiver Stations (BTSs), or any other type of base station). The vehicles 605 may be considered or include terminal devices (e.g., cellular terminal devices, including Mobile Stations (MSs), User Equipments (UEs), or any type of cellular terminal device).

Network access nodes 610 and 620 may therefore interface (e.g., via backhaul interfaces) with a cellular core network such as an Evolved Packet Core (EPC, for LTE), Core Network (CN, for UMTS), or other cellular core networks, which may also be considered part of a radio communication network. The cellular core network may interface with one or more external data networks. In an exemplary short-range context, network access nodes 610 may be or include access points (APs, e.g., WLAN or WiFi APs), while terminal devices e.g., 605 may be short range terminal devices (e.g., stations (STAs)). Network access nodes 610 and 620 may interface (e.g., via an internal or external router) with one or more external data networks.

Network access nodes 610 and 620 (and, optionally, other network access nodes of radio communication network 100 not explicitly shown in FIG. 6) may accordingly provide a radio access network to terminal devices 605 (and, optionally, other terminal devices of radio communication network 100 not explicitly shown in FIG. 6). In an exemplary cellular context, the radio access network provided by network access nodes 610 and 620 may enable terminal devices 605 to wirelessly access the core network via radio communications. The core network may provide switching, routing, and transmission, for traffic data related to terminal devices 605 and may further provide access to various internal data networks (e.g., control servers, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 610 and 620 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network may be governed by radio communication technology protocols (or, equivalently, standard) that can vary depending on the specifics of radio communication network. Such radio communication technology protocols may define the scheduling, formatting, and routing of both user and control data traffic through radio communication network, which includes the transmission and reception of such data through both the radio access and core network domains of radio communication network. Accordingly, terminal devices 605 and network access nodes 610 and 620 may follow the defined radio communication technology protocols to transmit and receive data over the radio access network domain of radio communication network, while the core network may follow the defined radio communication technology protocols to route data within and outside of the core network. Exemplary radio communication technology protocols include LTE, UMTS, GSM, WiMAX, Bluetooth, WiFi, mmWave, etc., any of which may be applicable to radio communication network 100.

Referring, again to step 115 of FIG. 1, the blurred data may be transmitted in any suitable manner. In one case, a system may send the blurred data in accordance with a pull situation, e.g., in response to a request from another entity (e.g., another vehicle, device, node, etc.). Further, the blurred data may be transmitted periodically. In other words, at specified times, the blurred data may be sent in general, or broadcast manner, or may be sent in a more specified way to one or more specified entities (vehicles, devices, etc.).

Further, in accordance with exemplary embodiments of the present disclosure, the location data and the sensor data can be blurred so that the resulting blurred data maintains the current safety state or situation. In other words, general blurring of data may generate blurred data at one or more locations that could produce or lead to a hazardous traffic safety situation if relied upon. Therefore, the blurred data may be restricted to allowed locations in a traffic area. These allowed locations may be predetermined. In one example, the allowed location areas may be limited to roads, lanes or sides of roads, or any other suitable, real-world restriction.

Figure 3:
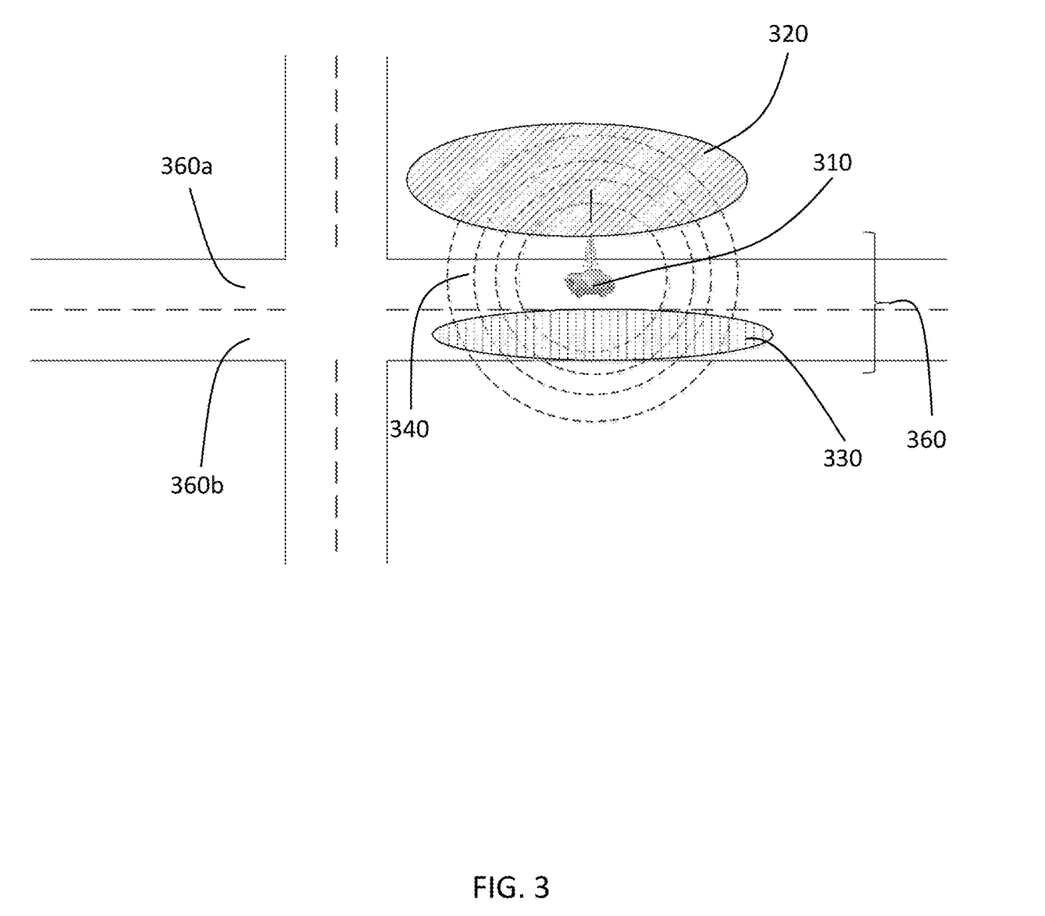
FIGS. 3 and 4 are exemplary views environments in which methods or processes described herein are implemented according to at least one exemplary embodiment of the present disclosure.

FIG. 3 is a pictorial representation of a vehicle 310 traveling on the road 360. As shown, the vehicle 310 is traveling on lane 360a of the road 360. The vehicle 310 itself, or another element/system may obtain the location data and sensor data of the vehicle 310. As noted in the context of FIG. 1, this acquired location data and the sensor data may be blurred. In this case, the resulting blurred data may location data indicating location areas 320 and 330, which can be within a certain radius 340 of the vehicle 310.

However, the blurred locations 320 and 330 may not be suitable location areas to be relied upon. The blurred location 320 indicates the vehicle 310 is not on the road 360. Thus, this blurred location data may not be useful or worse can be potentially hazardous if relied upon. Similarly, the blurred location 330 may also not be a suitable location. The blurred location 330 may indicate that the vehicle 310 is on the opposite or a "wrong side" of the road 360, in lane 360b. Again, this may not be useful or may present danger if such a blurred location area was relied on for the position or possible position of the vehicle 310.

Accordingly, if a device or object receives and uses the blurred data that is not subject to any restrictions or filtering, it could be used by another device or system in a dangerous or ineffective way. For example, in the context of FIG. 3, if another second vehicle approaches the vehicle 310 from an opposite direction, a device/system of such a vehicle receiving the blurred data may wrongly rely on such data and travel directly head-on towards the second vehicle wrongly determining such a path is safe.

Similarly, again in the context of FIG. 3, another vehicle receiving the blurred data may wrongly determine that the vehicle 310 is at location 320 and therefore the road 360 is clear of vehicles or at least clear of vehicle 310. This vehicle could be traveling in the same direction as vehicle 310 along or in lane 360a and wrongly determine or access that the road 360 is at least partially clear of any vehicles, and may in a manner (e.g., too fast) for the actual conditions of the traffic area.

Therefore, in accordance with exemplary embodiments, the location areas of the blurred data may be restricted or filtered.

Figure 4:
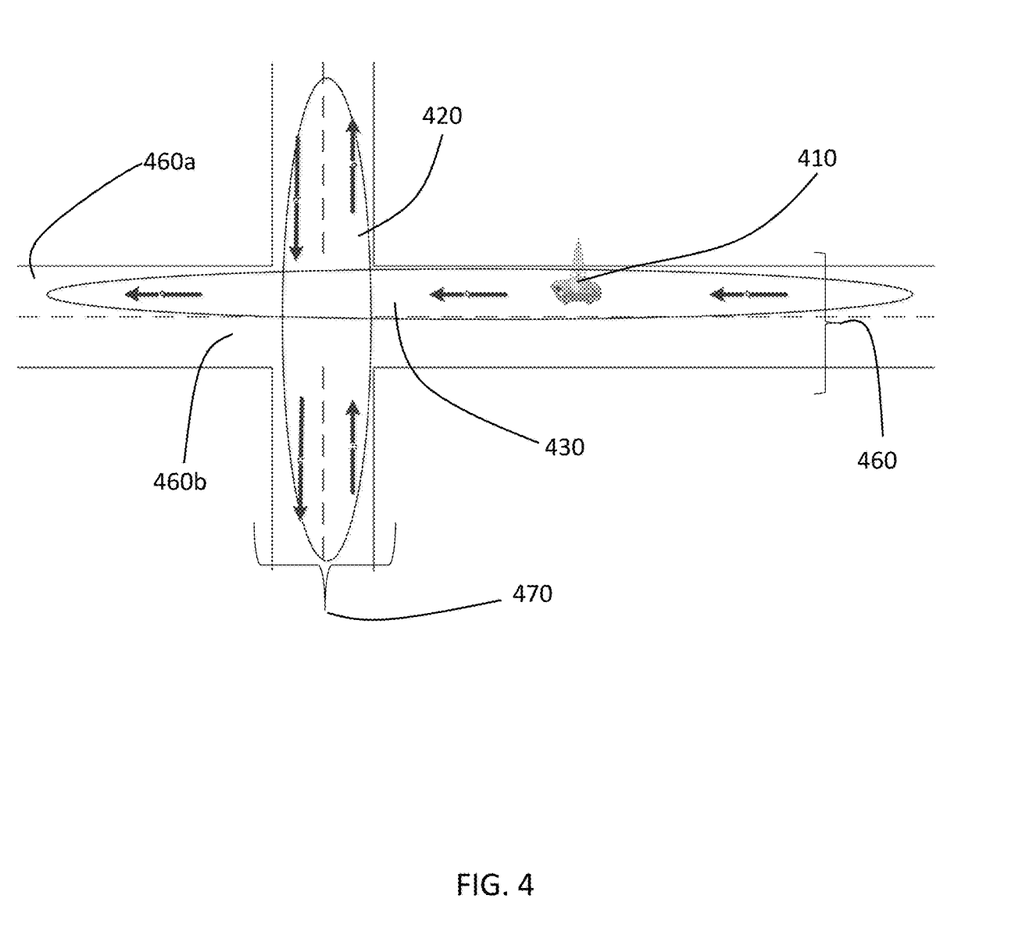

Accordingly, the realizable locations of the blurred data may need to be restricted or controlled. An example of the locations of the blurred data being appropriately restricted or filtered can be seen in FIG. 4. FIG. 4 shows a motor vehicle 410 traveling on the road 460. Similar to the depicted situation of FIG. 3, the vehicle is traveling on the right side or lane 460a of road 460. Again, the vehicle 410 itself, or another system may generate blurred location data and/or sensor data corresponding to the vehicle 410. The blurred data may be transmitted and then received by another entity.

That is, following the process described in the context of FIG. 1, obtained location data and the sensor data associated with at least the vehicle 410 may be blurred. However, the blurred data now is restricted so that blurred data locations 420 and 430, are within allowed areas, or areas which may not present a danger to another vehicle, pedestrian, entity, etc. if relied upon.

In this example, the blurred locations 420 and 430 are two possible positions the vehicle 310 on the road 460 and on the road 470. Please note in exemplary embodiments, one of or both of positions 420 and 430 may be generated for the blurred data. The blurred location 430 maintains the lane orientation of the vehicle 410; that is the blurred location 430 is located within or overlaps with lane 460a, the same lane that vehicle 410 is (currently) on or within. The maintenance of the direction, lane, orientation, or other parameters of the traffic entity or object, which in this case is vehicle 410, in the blurred data may depend on a determination of the traffic situation or activity. For example, in the case of a second vehicle traveling on the road 460, it may be important that such a second vehicle receives blurred data that indicates the right direction and lane location of the vehicle 410 on the road 460.

However, the lane or travel direction may not be important or needed with respect to the blurred location 420 for maintaining or facilitating traffic safety. That is, for supporting or promoting traffic safety, it may be permissible that the blurred location 430 includes an area covering a portion of both lanes 460a and 460b of road 470.

Thus, in accordance with exemplary embodiments of the present disclosure, blurred data may be restricted by filtering or limiting the blurred locations using map data or other location data. In other words, the blurred data process may include blurring obtained location data and/or sensor data, (for example blurring through adding noise) and then filtering through available or accessible map data, geographical data, or other location data. That is, the filtering restrictions the blurred locations to certain locations (e.g., thoroughfares, roads, highways, parking lots, etc.) Or the filtering does not allow the blurred location to be an unallowable location, e.g., certain off-road positions/places, certain road lanes (e.g., wrong or opposite side of road), etc. That is, the at least one computing device analyzes and recognizes or finds the allowable or not allowable places from the obtained or accessed map data. The allowability or non-allowability, as explained herein, may be context dependent and safety dependent. For example, in one situation, if a vehicle is determined to be far enough away, either lane of road may be allowable. Whereas if the vehicle is closer to the device or system, the safety situation changes and only the "correct side" of the road is allowable.

In Figure, for example, the blurred locations 420, 430 may result from taking an initial blurred data and then appropriately restricting at least to the positions or areas of thoroughfares. Further, other appropriate restriction rules may also be applied, e.g., limiting the blurred data to a particular lane, for example, a lane of a traffic entity or object to which the blurred data refers. Another rule may be to specify or restrict the size of a blurred location of the blurred data. The restriction rules may be dynamic or depending on the current traffic activity or situation. In the case of a dense or massive traffic situation, where various vehicles or traffic objects or entities are in relatively close to one another, then the blurred location data ultimately generated may be more accurate or precise in contrast to a case where traffic is lighter and vehicles are spread relatively far apart.

Figure 7:
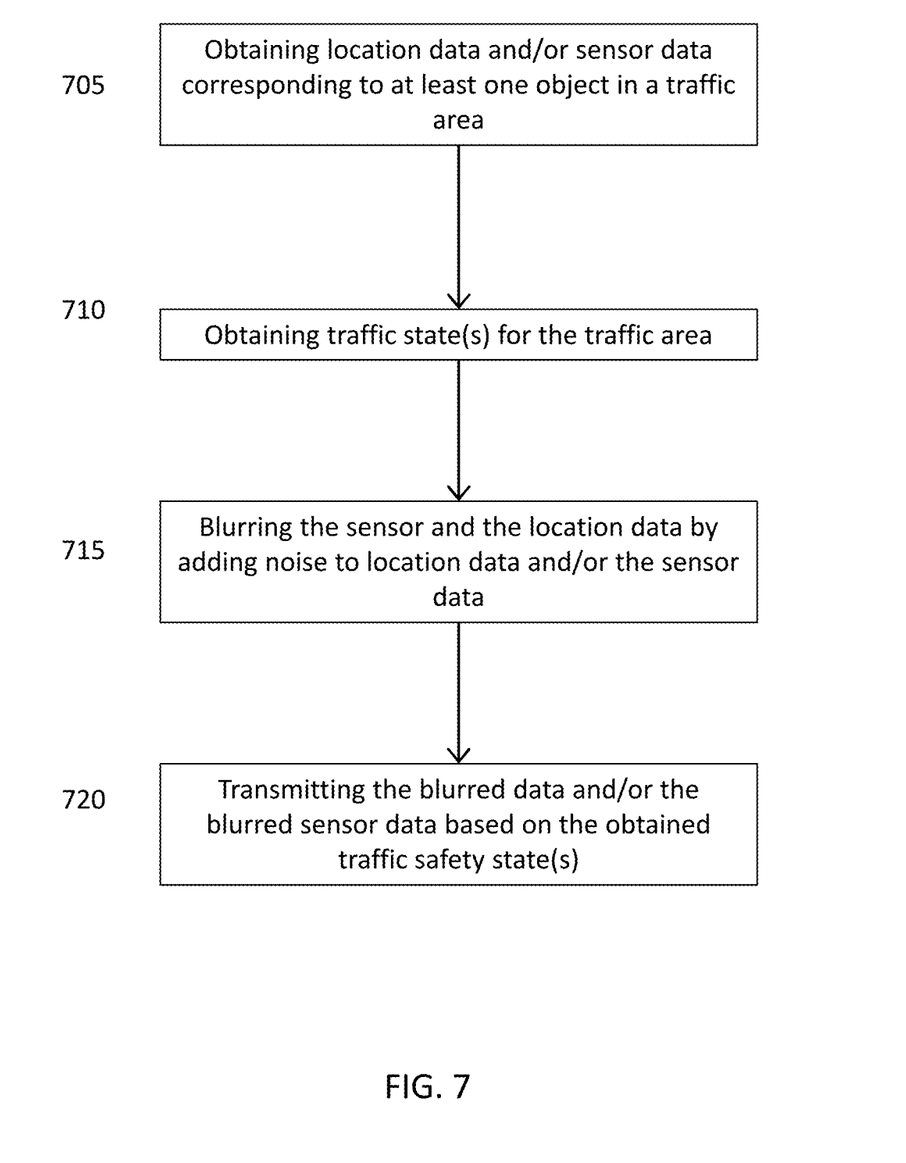
FIG. 7 shows an exemplary process according to at least one exemplary embodiment of the present disclosure.

FIG. 7 shows, according to at least one exemplary embodiment of the present disclosure, a method for dynamically handling traffic data. One or more computing devices may implement the exemplary method. For, the process of FIG. 7 or another processor similar thereto, may be performed or executed by a suitable device or system, such as the exemplary system depicted in FIG. 2. Further, some steps or events may be the same or similar as disclosed in FIG. 1. Therefore, some details may be omitted here but can be found in the description of the exemplary embodiments related to FIG. 1.

At 705, the method includes obtaining location data and/or sensor data corresponding to at least one object in a traffic area. The traffic area may be predefined or may be the traffic area within a certain distance or radius of a traffic object or entity (vehicle, bicyclist, pedestrian, etc.).

At 710, a traffic state or states are obtained or acquired for the traffic area. For example, referring to FIG. 2, the system 210 may receive information that either indicates the traffic safety states in the region, receives information to determine the traffic state of the least one object. The traffic state may include the position, orientation, velocity, direction of travel, spacing between other vehicles and other traffic-related attributes. The traffic state may also include an expected or anticipated traffic state based on the current traffic state. The likely or expected traffic state may be acquired from another source or determined locally, e.g., in a device or system such as system 210.

According to FIG. 7, at 715, the method further includes blurring the sensor and the location data by adding noise to location data and/or the sensor data. As explained, additive noise, e.g., AWGN may be added to the obtained location and/or sensor data as described in connection with FIG. 1.

Further, the method of FIG. 7 includes, at 720, transmitting the blurred data based on the traffic safety states. For example, referring back to FIG. 4, the vehicle may transmit the blurred locations 420 and 430. However, depending on the traffic situation, e.g., the presence of a pedestrian(s), cyclist(s), another vehicle or other vehicles, road obstruction (s), etc., only one of the two blurred location is transmitted.

Further, in some exemplary embodiments of the present disclosure, the obtained location and/or sensor data may be transmitted. That is the obtained location and/or sensor data may be sent instead of or in addition to the blurred data. That is, depending on the situation or the acquired traffic safety states, the "unfiltered" or at least an unaltered portion of the location data and/or sensor data may be transmitted.

In further exemplary embodiments of the present disclosure, blurring obtained location and/or sensor data includes creating one or more versions or levels of blurred data. The blurring of the location data and/or sensor data may be implemented so that one or plurality different levels of blurred location data and/or sensor data are created.

In at least one exemplary embodiment in which the blurred data has a plurality of "blurred levels." For each blurred level of the blurred data, the corresponding location data and/or sensor data is blurred or obfuscated to a different extent. The amount of blurring for a particular blurred level may correspond to the size or amount of the amount of area of the blurred location data. In other words, a particular blurred level can include a location area or areas that are spread out with a certain or defined amount of precision or accuracy for at least one traffic object or entity.

In some exemplary embodiments of the present disclosure, the precision, spreading, or accuracy of the blurred location data may be determined or affected by the amount or intensity of noise added to the obtained location and/or sensor data.

A blurred level corresponding to a high amount of blurring may result in the blurred location data indicating that an object is within an area or areas (e.g., land areas) that cover a higher amount of area or space than the obtained location data and/or sensor data. Further, the blurred location data in different blurred levels respectively produce blurred data with varying amounts of coverage by size.

For instance, blurred data of an object in a first blurred level with a lower amount of blurring may be represented in a smaller location area or region compared to the blurred data for the same object with a higher amount of blurring, in a second blurred level. That is, the first blurred level may be said to be more accurate than the blurred level with a higher amount of blurring.

The amount of blurring, e.g., the accuracy or amount spreading for one or a plurality of different levels may be predetermined or specified. That is, a system such as system 210, or another suitable system may be programmed to generate one or plurality of blurring levels for blurring data with specified amounts of blurring.

Further, in some exemplary embodiments of the present disclosure, the amount of blurring for a single or multiple blurring levels is dynamic. In at least one example, the amount of blurring may be dependent on the obtained traffic state(s) for the traffic area. In other words, the amount or intensity of blurring can be dependent on the current traffic situation. For example, if the obtained traffic safety states indicate a low level of danger for at least the traffic object or object(s), then the amount of blurring may be considerable. Similarly, if the obtained traffic safety states indicate a high amount of danger, the blurring may be minimal or non-existent.

In general, the precision of the location information in the blurred data may be adjusted (gradually) over time to reflect the current level of emergency. The gradations of emergency levels may be categorized by any appropriate manner, e.g., a numerical value or any other suitable classification of levels. A simplified version of this can be seen in the table below:

| Level of Danger/emergency | Amount of Blurring or Noise added (Sigma_2) |
| --- | --- |
| None or Low | Large |
| Medium | Medium |
| High | Low or None |

Regardless, in exemplary embodiments, the blurring of location data is done in such a way that no emergency situation occurs due to the blurring (e.g., vehicle seems to drive on wrong side of the road just because of blurring, etc.). In other words, the blurring is done so as to not to cause or add to any traffic problems.

In an example using the exemplary table above, the variance of the noise (e.g., AWGN) that is applied to the blurred data for each of the levels depends on the detected or the indicated level of danger/emergency from the obtained traffic safety state(s). While the variance of noise is shown as being adjusted according to each danger level, other variations or parameters of the noise may also be appropriate for each traffic danger level.

Moreover, in some exemplary embodiments, other factors may be used or other aspects of the obtained location data and/or sensor data may be manipulated or adjusted, in addition to or beside noise, may be applied obtained location and/or sensor data for each danger level.

Further, in accordance with at least one exemplary embodiment of the present disclosure, transmitting the blurred data includes transmitting all or a portion of the blurred data. For example, if the blurred data includes a plurality of blurred levels, one, some, or all of the blurred levels of the blurred data are transmitted. The selection of which blurred levels transmitted may be dependent on the obtained traffic safety states or the current traffic situation.

Further, the transmission of particular blurred levels of the blurred data may be dependent on the recipient. For example, there may be different ranks or levels for the varying types of recipients. That is, a transmitting device or system (e.g., system 210) may require identifying one or more recipients and then send a particular blurred level based on the identification of the recipient. For example, a high-ranking authorized vehicle may, e.g., police vehicle may receive blurring data with the lowest level of blurring regardless of the traffic safety situation. The police vehicle or other device or system associated with a high-ranking may indicate (e.g., transmit) their identity or status and then receive the blurred location data with a certain blurred level.

Similarly, a foreign or unknown entity (e.g., device/system) may only receive the appropriate or warranted blurring level appropriate for the present situation or case. For example, if the danger level is determined to be low, then an unknown device (e.g., unknown to the transmitter) may receive the highest level of blurring.

In general according to one or more exemplary embodiments of the present disclosure, blurring helps to maintain the anonymity or privacy of traffic entities or objects while also maintaining, protecting, or promoting traffic safety. In general, the user privacy is sufficiently protected. In emergency situations, the precise location information may be available to prevent an accident. That, in accordance with exemplary embodiments of the present disclosure, blurring of location data or sensor data is done in such a way that no emergency situation occurs just because of the blurring.

In general, and according to various exemplary embodiments of the present disclosure, blurring of may be done so that user privacy is protected. Further, blurring is done so that no emergency situation occurs due to the blurring.

The following examples pertain to further aspects of this disclosure:

Example 1 is a method for handling traffic data, the method for execution by one or more computing devices includes obtaining, location data and sensor data corresponding to at least one object located in a traffic area; blurring the sensor data and the location data, the blurring comprising adding noise to the location data and/or the sensor data; transmitting, the blurred data.

In Example 2, the subject matter of Example 1, wherein the sensor data can be obtained from one or more sensors of a first motor vehicle.

In Example 3, the subject matter of Example 2, wherein the one or more sensors can be at least one of a sonar, a LIDAR, a video, an image, or a V2X sensor.

In Example 4, the subject matter of any of Examples 1 to 3, wherein the location data can include mobile communication location data.

In Example 5, the subject matter of any of Examples 1 to 4, wherein the location data can include satellite-based radio navigation system location data.

In Example 6, the subject matter of any of Examples 1 to 5 can further include determining a safety state of the traffic area, and wherein the blurring maintains a current safety state of the at least one object.

In Example 7, the subject matter of Example 6 can further include obtaining the current safety state of the object.

In Example 8, the subject matter of Example 7, wherein obtaining the current safety state of the object can include determining the current safety state of the at least one object using at least one of the obtained location data or the sensor data.

In Example 9, the subject matter of Example 8, wherein an amount of the noise added to the location data and/or the sensor data can be based on the obtained current safety state of the object.

In Example 10, the subject matter of any of Examples 1 to 9, wherein the added noise can include Gaussian white noise.

In Example 11, the subject matter of Examples 1 to 10, wherein the at least one object can include at least a second motor vehicle, a pedestrian, and/or a bicyclist.

In Example 12, the subject matter of any of Examples 1 to 11, wherein the blurred data can indicate that the at least one object is on a same side or same lane of a road or throughway as is also indicated by the corresponding location data and sensor data.

In Example 13, the subject matter of any of Examples 1 to 12, wherein the blurred data can indicate the at least one object is off or outside boundaries of a road as is indicated by the corresponding location data and sensor data.

In Example 14, the subject matter of any of Examples 1 to 13, wherein the blurred data can indicate the at least one object has crashed or is about to crash, as is indicated by the corresponding location data and sensor data.

In Example 15, the subject matter of any of Examples 1 to 14, wherein the blurred data can indicate one or more allowable location areas for the at least one object in the traffic area.

In Example 16, the subject matter of Example 15, wherein the one or more location areas can be one or more predefined allowable locations.

In Example 17, the subject matter of any of Examples 15 or 16, wherein the one or more allowable locations can correspond to one or more thoroughfares.

In Example 18, the subject matter of any of Examples 15 to 17, wherein the one or more allowable locations can correspond to one side or one lane of one of the one or more thoroughfares.

In Example 19, the subject matter of any of Examples 1 to 18, wherein the blurred data can be transmitted wirelessly.

In Example 20, the subject matter of Example 19, wherein the blurred data is transmitted wirelessly using at least one of ITS G5 or LTE C-V2X.

In Example 21, the subject matter of Example 19, wherein the blurred data can be transmitted wirelessly from the first motor vehicle to a communication node.

In Example 22, the subject matter of Example 21, wherein the communication node can be a roadside unit.

In Example 23, the subject matter of Example 2, wherein the blurred data can be transmitted wirelessly from the first motor vehicle to a second motor vehicle.

In Example 24, the subject matter of any of Examples 1 to 23, wherein the object location data and the blurred data can include two-dimensional (2D) location data.

In Example 25, the subject matter of any of Examples 1 to 24, wherein the object location data and the blurred data can include three-dimensional (3D) location data.

In Example 26, the subject matter of any of Examples 1 to 25, wherein blurring the sensor data and the location data can include generating a plurality of blurred versions of the location data and/or sensor data.

In Example 27, the subject matter of Example 26, wherein transmitting the blurred data can include transmitting at least one of the plurality of blurred versions of the location data and/or sensor data.

In Example 28, the subject matter of any of Examples 1 to 27, wherein transmitting can include transmitting the blurred data in response to a received or obtained request.

In Example 29, the subject matter of any of Examples 1 to 28, wherein transmitting the blurred data can include transmitting the selected location data periodically or at one or more scheduled times.

Example 30 is a system for handling traffic data, the system comprising one or more computing devices configured to obtain location data and sensor data corresponding to at least one object located in a traffic area; blur the sensor data and the location data by adding noise to the location data and/or the sensor data; and to transmit the blurred data.

In Example 31, the subject matter of Example 30, wherein the system can include one or more sensors that obtain the sensor data.

In Example 32, the subject matter of Example 31, wherein the system can be part of a first motor vehicle.

In Example 33, the subject matter of any of Examples 31 or 32, wherein the one or more sensors can be at least one of a sonar, a LIDAR, a video, an image, or a V2X sensor.

In Example 34, the subject matter of any of Examples 30 to 33, wherein the location data can include mobile communication location data.

In Example 35, the subject matter of any of Examples 30 to 34, wherein the system can include a transceiver configured to obtain the mobile communication data.

In Example 36, the subject matter of any of Examples 30 to 35, wherein the location data can include satellite-based radio navigation system location data.

In Example 37, the subject matter of any of Examples 30 to 36, wherein the system can include a satellite navigation receiver configured to obtain satellite-based radio navigation system location data.

In Example 38, the subject matter of any of Examples 30 to 37, the system can be further configured to determine a safety state of the traffic area, and wherein the system is configured to blur while maintaining a current safety state of the at least one object.

In Example 39, the subject matter of Example 38, wherein the system can be further configure to obtain the current safety state of the object.

In Example 40, the subject matter of Example 39 wherein the system is configured to obtain the current safety state of the object by determining the current safety state of the at least one object using at least one of the obtained location data or the sensor data.

In Example 41, the subject matter of Example 39, wherein an amount of the noise configured to be added to the location data and/or the sensor data by the system can be based on the obtained current safety state of the at least one object.

In Example 42, the subject matter of any of Examples 30 to 41, wherein the at least one object can include at least one of a second motor vehicle, a pedestrian, and/or a bicyclist.

In Example 43, the subject matter of any of Examples 30 to 42, wherein the blurred data can indicate that the at least one object is on a same side or same lane of a road or throughway as is also indicated by the corresponding location data and sensor data.

In Example 44, the subject matter of any of Examples 30-43, wherein the blurred data can indicate the at least one object is off or outside boundaries of a road as is indicated by the corresponding location data and sensor data.

In Example 45, the subject matter of any of Examples 30-44, wherein the blurred data can indicate the at least one object has crashed or is about to crash, as is indicated by the corresponding location data and sensor data.

In Example 46, the subject matter of any of Examples 30-45, wherein the blurred data can indicate one or more allowable location areas for the at least one object in the traffic area.

In Example 47, the subject matter of Example 46, wherein the one or more location areas can be one or more predefined allowable locations.

In Example 48, the subject matter of any of Examples 46 or 47, wherein the one or more allowable locations can correspond to one or more thoroughfares.

In Example 49, the subject matter of any of Examples 46 or 47, wherein the one or more allowable locations can correspond to one side or one lane of one of the one or more thoroughfares.

In Example 50, the subject matter of any of Examples 30-49, wherein the added noise can include Gaussian white noise.

In Example 51, the subject matter of any of Examples 30-50, wherein the system can be configured to transmit the blurred data wirelessly.

In Example 52, the subject matter of Example 51, wherein the system can be configured to transmit the blurred data wirelessly using at least one of ITS G5 or LTE C-V2X.

In Example 53, the subject matter of Examples 32, wherein the blurred data can be transmitted wirelessly from the first motor vehicle to a communication node.

In Example 54, the subject matter of Example 53, wherein the communication node can be a roadside unit.

In Example 55, the subject matter of Example 32, wherein the system can be configured to transmit the blurred data wirelessly from the first motor vehicle to a second motor vehicle.

In Example 56, the subject matter of any of Examples 30 to 55, wherein the object location data and the blurred data can include two-dimensional (2D) location data.

In Example 57, the subject matter of any of Examples 30 to 56, wherein the object location data and the blurred data can include three-dimensional (3D) location data.

In Example 58, the subject matter of any of Examples 30 to 57, wherein the system can be configured to blur the sensor data and/or the location data by generating a plurality of blurred versions of the location data and/or sensor data.

In Example 59, the subject matter of Example 58, wherein the system can be configured to transmit the blurred data by transmitting at least one of the plurality of blurred versions of the location data and/or sensor data.

In Example 60, the subject matter of any of Examples 30 to 59, wherein the system can be configured to transmit the blurred data in response to a received or obtained request.

In Example 61, the subject matter of any of Examples 30 to 60, wherein the system can be configured to transmit the blurred data by transmitting the selected location data periodically or at one or more scheduled times.

Example 62 can include at least one non-transitory machine readable medium comprising a plurality of instructions that in response to being executed on at least one computing device, cause the at least one computing device to obtain location data and sensor data corresponding to at least one object located in a traffic area; blur the sensor data and the location data by adding noise to the location data and/or the sensor data; and to transmit the blurred data.

In Example 63, the subject matter of any of Example 62, wherein the plurality of instructions can further cause the at least one computing device to determine a safety state of the traffic area, and wherein the system is configured to blur while maintaining a current safety state of the at least one object.

In Example 64, the subject matter of Example 63, wherein the plurality of instructions can further cause the at least one computing device to obtain the current safety state of the object.

In Example 65, the subject matter of Example 64, wherein the plurality of instructions can further cause the at least one computing device to obtain the current safety state of the object by determining the current safety state of the at least one object using at least one of the obtained location data or the sensor data.

In Example 66, the subject matter of any of Example 65, wherein an amount of the noise configured to be added to the location data and/or the sensor data by the system can be based on the obtained current safety state of the at least one object.

In Example 67, the subject matter of any of Examples 62-66, wherein the added noise can include Gaussian white noise.

In Example 68, the subject matter of any of Examples 62-67, wherein the plurality of instructions can further cause the at least one computing device to transmit the blurred data wirelessly.

In Example 69, the subject matter of any of Examples 62 to 68, wherein the at least one object is at least one of following, a motor vehicle, a pedestrian, or bicyclist.

In Example 70, the subject matter of any of Examples 62 to 69, wherein the blurred data can indicate that the object is on a same side or same lane of a road or throughway as is also indicated by the corresponding location data and sensor data.

In Example 71, the subject matter of any of Examples 62-70, wherein the blurred data can indicate the at least one object is off or outside boundaries of a road as is indicated by the corresponding location data and sensor data.

In Example 72, the subject matter of any of Examples 62-71, wherein the blurred data can indicate the at least one object has crashed or is about to crash, as is indicated by the corresponding location data and sensor data.

In Example 73, the subject matter of any of Examples 62-72, wherein the blurred data can indicate one or more location areas for the at least one object in the traffic area.

In Example 74, the subject matter of any of Example 62-73, wherein the one or more location areas can be one or more predefined allowable locations.

In Example 75, the subject matter of any of Examples 62-74, wherein the one or more allowable locations can correspond to one or more thoroughfares.

In Example 76, the subject matter of any of Examples 62-77, wherein the one or more allowable locations can correspond to one side or one lane of one of the one or more thoroughfares.

In Example 77, the subject matter of any of Examples 62 to 76, wherein the object location data and the blurred data can include two-dimensional (2D) location data.

In Example 78, the subject matter of any of Examples 62 to 77, wherein the object location data and the blurred data can include three-dimensional (3D) location data.

In Example 79, the subject matter of any of Examples 62 to 78, wherein the plurality of instructions can further cause the at least one computing device to blur the sensor data and/or the location data by generating a plurality of blurred versions of the location data and/or sensor data.

In Example 80, the subject matter of Example 79, wherein the plurality of instructions can further cause the at least one computing device to transmit the blurred data by transmitting at least one of the plurality of blurred versions of the location data and/or sensor data.

In Example 81, the subject matter of any of Examples 62 to 80, wherein the plurality of instructions can further cause the at least one computing device to transmit the blurred data in response to a received or obtained request.

In Example 82, the subject matter of any of Examples 62 to 81, wherein the plurality of instructions can further cause the at least one computing device to transmit the blurred data by transmitting the selected location data periodically or at one or more scheduled times.

In Example 83, the subject matter of any of Examples 62 to 82, wherein the location data can include mobile communication location data.

In Example 84, the subject matter of any of Examples 62 to 83, wherein the location data can include satellite-based radio navigation system location data.

It should be noted that one or more of the features of any of the examples above may be combined with any one of the other examples.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

What is claimed is:

1. A method for handling traffic data, the method for execution by one or more computers comprises:
   obtaining, location data and sensor data corresponding to at least one object located in a traffic area;
   blurring the sensor data and the location data, the blurring comprising adding noise to the location data and/or the sensor data;
   transmitting, the blurred data;
   determining a safety state of the traffic area;
   obtaining a current safety state of the at least one object, wherein the blurring maintains the current safety state of the at least one object and
   wherein an amount of the noise added to the location data and/or the sensor data is based on the obtained current safety state of the at least one object.

2. The method of claim 1, wherein the sensor data is obtained from one or more sensors of a first motor vehicle.

3. The method of claim 2, wherein the one or more sensors are at least one of a sonar, a LIDAR, a video, an image, or a V2X sensor.

4. The method of claim 1, wherein the location data comprises mobile communication location data.

5. The method of claim 1, wherein the location data comprises satellite-based radio navigation system location data.

6. The method of claim 2, wherein the at least one object includes a second motor vehicle.

7. The method of claim 6, wherein the blurred data indicates that the second motor vehicle is on a same side of a road as indicated by the corresponding location data and sensor data.

8. The method of claim 6, wherein the blurred data indicates the second motor vehicle is off a road as indicated by the corresponding location data and sensor data.

9. The method of claim 6, wherein the blurred data indicates the second motor vehicle has crashed or is about to crash, as indicated by the corresponding location data and sensor data.

10. The method of claim 1, wherein the blurred data indicates one or more location areas for the at least one object in the traffic area.

11. The method of claim 10, wherein the one or more location areas are one or more predefined allowable locations.

12. The method of claim 11, wherein the one or more predefined allowable locations correspond to one or more thoroughfares.

13. The method of claim 12, wherein the one or more predefined restricted locations corresponds to one side or one lane of one of the one or more thoroughfares.

14. The method of claim 2, wherein the blurred data is transmitted wirelessly from the first motor vehicle to a communication node.

15. The method of claim 2 wherein the blurred data is transmitted wirelessly from the first motor vehicle to a second motor vehicle.

16. The method of claim 1, wherein blurring the sensor data and the location data comprises generating a plurality of blurred versions of the location data and/or sensor data.

17. The method of claim 16, each of the plurality of blurred versions of the location data and/or sensor data have a different amount of noise added.

18. A method for handling traffic data, the method for execution by one or more computers comprises:
   obtaining, location data and sensor data corresponding to at least one object located in a traffic area;
   blurring the sensor data and the location data, the blurring comprising adding noise to the location data and/or the sensor data so that noise is added to position coordinate data of the location and/or sensor data;
   transmitting, the blurred data;
   determining a safety state of the traffic area,
   obtaining a current safety state of the at least one object, wherein obtaining the current safety state of the at least one object comprises determining the current safety state of the at least one object using at least one of the obtained location data or the sensor data, and wherein the blurring maintains the current safety state of the at least one object.

\* \* \* \* \*